United States Patent [19]

Moskovich et al.

[11] Patent Number: 4,749,268

[45] Date of Patent: Jun. 7, 1988

[54] AUTOFOCUSING ZOOM LENS

[75] Inventors: Jacob Moskovich, Cincinnati, Ohio; Ellis I. Betensky, Redding, Conn.

[73] Assignee: Vivitar Corporation, Chatsworth, Calif.

[21] Appl. No.: 737,728

[22] Filed: May 28, 1985

[51] Int. Cl.⁴ ............................................. G02B 15/20
[52] U.S. Cl. .................................................. 350/429
[58] Field of Search ................................. 350/429, 430

[56] References Cited

U.S. PATENT DOCUMENTS

| | | | |
|---|---|---|---|
| 3,455,628 | 7/1969 | Back | 350/429 |
| 3,658,411 | 4/1972 | Price | 350/429 |
| 3,731,987 | 5/1973 | Iida et al. | 350/430 |
| 3,840,290 | 10/1974 | Betensky et al. | 350/429 |
| 3,972,056 | 7/1976 | Tsujimoto et al. | 350/430 |
| 4,008,951 | 2/1977 | Himmelsbach | 350/429 |
| 4,161,756 | 7/1979 | Thomas | 350/429 |

Primary Examiner—John K. Corbin
Assistant Examiner—Loha Ben
Attorney, Agent, or Firm—Costas and Montgomery

[57] ABSTRACT

An automatic focusing zoom lens which comprises a first positive group, a second variator group, a third compensator group, and a relay lens including an autofocus detector which receives a portion of the light entering the fourth group and controls a motor which drives the compensator group to maintain focus of the lens as well as compensating or the shift in focal plane due to movement of the variator group to change the equivalent focal length of the lens.

10 Claims, 2 Drawing Sheets

AUTOFOCUSING ZOOM LENS

FIELD OF THE INVENTION

This invention relates to zoom lenses and more particularly, to zoom lenses having the capability of automatic focusing.

BACKGROUND OF THE INVENTION

Typically, zoom lenses for so-called 35 millimeter single lens reflex cameras which have an image frame of 24×36 millimeters comprise four groups where the zoom lens is designed for the so-called telephoto range. By telephoto range, it is indicated that the lens may have a range of equivalent focal lengths rated at 70–210 millimeters, 80–200 millimeters, 80–240 millimeters, or other ranges where the lower equivalent focal length is greater than the diagonal of the image frame of the camera.

Such telephoto zoom lenses generally comprise four groups, a front positive group, a second negative group, a third positive group, and a fourth positive group which may be referred to as the master lens, or the objective lens. In some cases, the third group may be of negative optical power. Functionally stated, the purpose of the first group is to image an object; the function of the second group is to vary the equivalent focal length by change of axial distance with respect to the front group; the primary function of the third group is to move in a predetermined relation with the second group and maintain the image created by the overall lens at the image or focal plane of the camera; the fourth group transmits an image of the object to the image plane or focal plane of the camera. There have been some variations of this design which the fourth group may move and the third group remain stationary. However, it is primarily the change in axial spacing between the front positive group and the second negative group which varies the equivalent focal length of the lens.

These conventional telephoto zoom lenses require camming mechanisms to predetermine the motion of the second group for zooming and the motion of the third group to compensate for the location change in the image plane. The first group is axially movable on a helicoid to focus the lens.

Zoom lens may be constructed with a so-called one touch mechanism which may be moved axially of the lens barrel to vary the equivalent focal length and rotated to axially move only the front group of focusing. Alternatively, the telephoto zoom lenses may be constructed so that there are distinct focus and zooming rings where the zooming ring is mechanically connected to the zooming groups, that is, the second and third groups, to effect a change in equivalent focal length while the focusing ring is connected to the front group to axially move the front group for fine focusing.

In these conventional zoom lens designs, the front group generally comprises two components, one of which is a doublet and the other, a singlet. These components are always of positive power to converge the entering light rays and are the largest diameter and therefore, the heaviest lens elements in the overall lens. If it would be desired to provide an automatic focusing telephoto zoom lens, it would be impractical from the standpoint of time for focusing to move the conventional front focusing group to focus the lens. The autofocus mechanism for lens movements generally operates on two or three AA batteries, which will have a limited life and such limited life could be further decreased by the requirement to move a large lens group for focusing.

Accordingly, the present invention provides an autofocusing telephoto zoom lens in which the relatively small third group may be utilized for automatic focusing of the lens.

SUMMARY OF THE INVENTION

Briefly stated, the invention in one form thereof, comprises a four group lens of positive, negative, positive, positive configuration. The front group is held stationary, and does not move for focusing. The fourth group is divided into two subgroups of plus and minus configuration from the object to the image end. Disposed intermediate the two subgroups of the fourth group is a beam splitter, which reflects a small percentage of the light in the lens to an autofocus detector. A microcomputer then operates a motor to move the third group to maintain the image created by the lens at the focal plane of the camera and to also focus the lens by such movement of the third group. With this arrangement, there is not requirement to provide a very specific camming movement of the third group. Instead, only a simplified mechanism is required to move the second variator group; the third group automatically tracks the new image position to maintain focus of the lens.

In another form the lens comprises five groups of plus, minus, plus, plus, minus powers. The first and third groups move in fixed relation on either side of the second variator group to vary the equivalent focal length of the lens while the fourth positive group is moved according to the signal from the autofocus detector to maintain the image created by the lens at the correct focal plane of that lens.

An object of this invention is to provide a new and improved telephoto zoom lens which is capable of automatic focusing of the lens.

Another object of this invention is to provide an automatic focusing zoom lens of the type described in which the compensator group is automatically moved both to maintain a fixed image plane with zooming lens and focus the lens.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
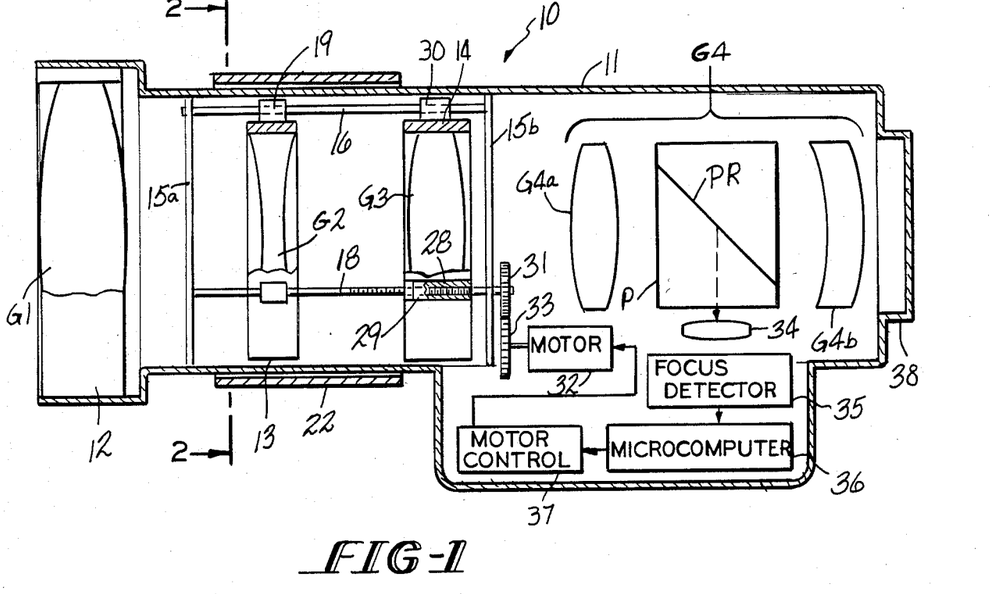
FIG. 1 is a diagrammatic side elevation of a lens embodying the invention.
Figure 2:
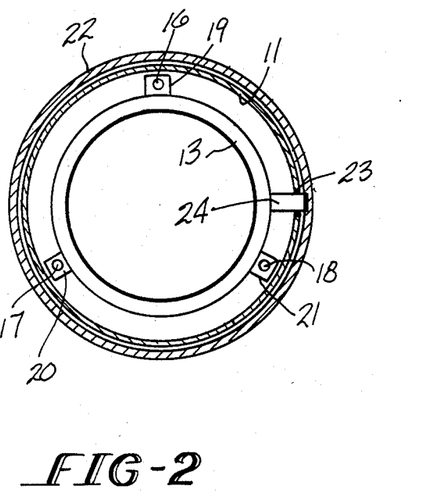
FIG. 2 is a view seen in the plane of lines 2—2 of FIG. 1.
Figure 3:
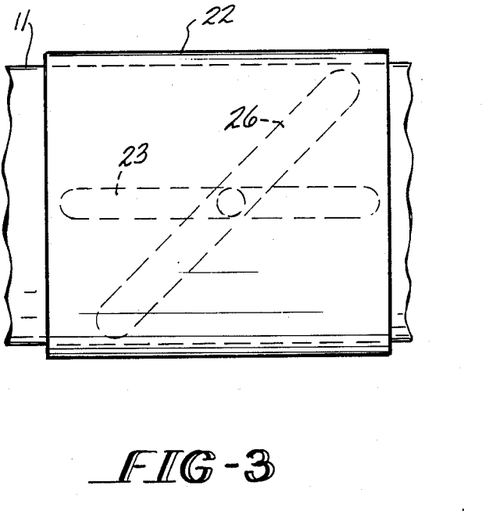
FIG. 3 is a diagrammatic view of the mechanism for effecting movement of the second group for zooming.

A zoom lens embodying the invention is diagrammatically shown in FIGS. 1–3. The lens 10 comprises a housing member 11 which receives a first stationary optical group G1 in a lens mount 12. A second negative optical group G2 is in a lens mount 13 and a third positive optical group G3 is in a lens mount 14. Group G2 is a variator and group G3 is a compensator group and also a focusing group. A pair of spaced apart support members 15a and 15b receive three equiangularly disposed rods 16, 17 and 18. Lens mount 13 has ears 19, 20 and 21 equiangularly extending therefrom through which the rod members extend. This permits movement of lens mount 13 axially on the rods. Lens mount 14 has similar ears through which rods 16–18 extend. A rotatable zoom ring 22 is disposed about barrel 11. Barrel 11 has a longitudinal slot 23 defined therein which receives a pin 24 extending from lens mount 12. Pin 24 is also received in a diagonal slot 26 in zoom ring 22 (FIG. 3). Thus, when zoom ring 22 is rotated, the edges of slot 26 engaging pin 24 will move the variator group G2 axially of the lens to vary the equivalent focal length thereof.

Rod 18 is threaded as indicated by the reference numeral 28 in FIG. 1 and an ear 29 of lens mount 14 is matingly threaded so that upon rotation of rod 18, mount 14 will move axially of the lens. As shown in FIG. 1, lens mount 14 has an upper ear 30 movable on rod 16. The third ear of lens mount 14 is not shown. Rod 18 extends through ear 29 of support 14 and receives on the end thereof a gear 31 which is driven by a motor 32 through a pinion 33.

The optical system of the lens in one form thereof further includes a fourth group G4 which comprises a front positive subgroup G4a and a rear negative subgroup G4b. Disposed between subgroups G4a and G4b is a prism P having planar object and image sides surfaces and a partially reflecting surface PR disposed at substantially forty-five degrees to the planar prism surfaces. Surface PR will reflect a small percentage of the light entering group G4 through a relay lens 34 to a focus detector 35. Focus detector 35 supplies a signal to a microcomputer 36. Microcomputer 36 through a motor control 37 drives motor 32. Autofocusing mechanisms are standard products of Honeywell, Inc. of Minneapolis, Minn. and designated as a TCL Automatic Focusing Detector. Automatic focusing detectors are described in U.S. Pat. No. 4,185,191 assigned to Honeywell, Inc. Such systems or the equivalent thereof are widely used in autofocusing cameras. A lens mount is indicated by reference numeral 38.

In operation, a lens embodying the invention will receive light from the object to be photographed. A portion of this light (approximately fifteen percent) will be refected from prism surface PR to focus detector 35 and hence the motor 32 will move compensator group G3 as defined by microcomputer 36. The user will set the foca length of the camera by manipulation of zoom ring 22 and the compensator group will be automatically moved to focus the lens at the selected equivalent focal length.

Figure 4:
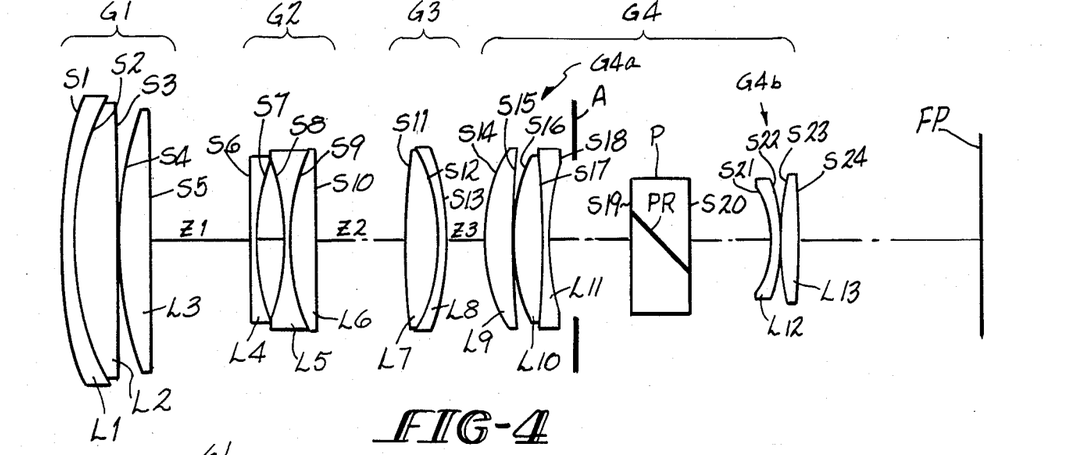
FIGS. 4–6 are schematic side elevations of lenses design in accordance with the invention.
Figure 5:
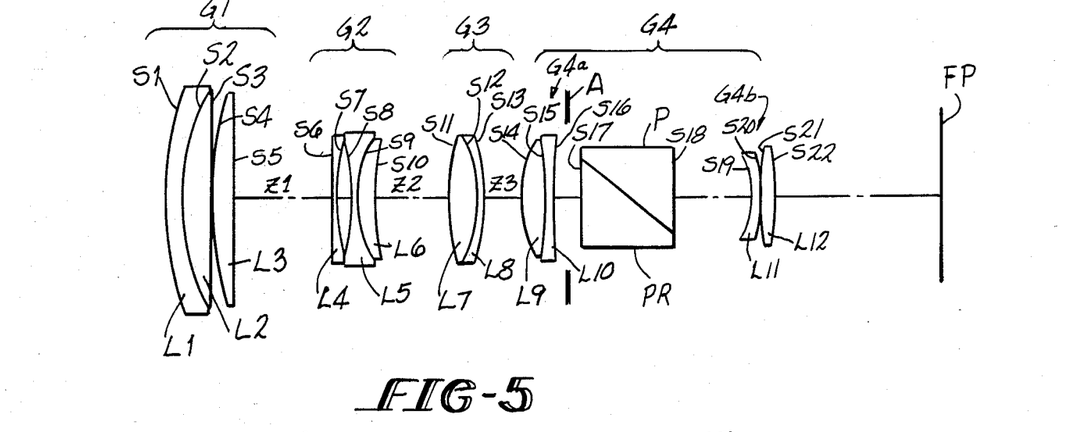

The lenses of FIGS. 4 and 5 each comprise four groups G1-G4. Group G1 in each example is a doublet L1, L2 followed by a single L3.

Group G2 comprises a negative meniscus L4 followed by a negative doublet L5, L6, concave to the object. Group G3 is a biconvex doublet L7, L8.

Group G4 in each case takes a telephoto form, that is, a positive subgroup G4a widely spaced from a negative subgroup G4b, with the prism P disposed therebetween. It will be noted that in FIGS. 4 and 5 the aperture is disposed on the image side of the positive subgroups G4a.

Figure 6:
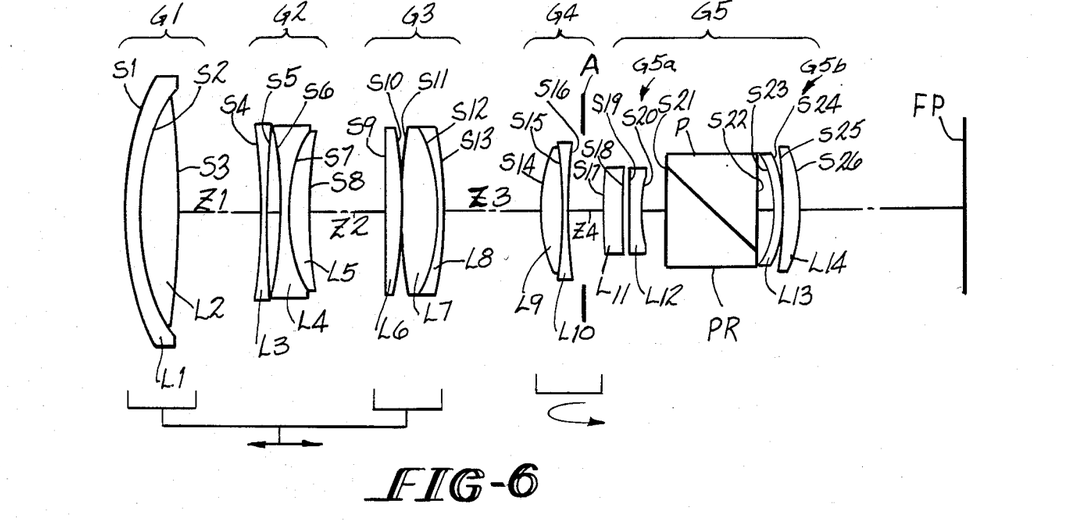

The lens of FIG. 6 is of different form. The variator group G2 is fixed while positive groups G1 and G3 move in fixed relation to effect change to focal length. The compensator group G4 is disposed immediately before the aperture on the object side thereof.

In this embodiment, the rear group G5 is of negative power.

In the examples of FIGS. 4 and 5, the variator group G2 moves linearly with rotation of the zoom ring 22 of FIG. 3 while the compensating and focusing group moves with reversing motion. The same is true in the example of FIG. 6 with respect to the movement of the positive groups G1 and G3.

Lenses embodying the invention scaled to an image format of 24×36 millimeters are substantially defined in Tables I, II and III, as shown in FIGS. 4–6. In the drawings and in the tables, lens elements from the object end are successively designated by the reference L followed by an arabic numeral; the radii of the surface of each element are successively designated S followed by an arabic numeral. The axial distance between the lens elements is set forth. The index of refraction of each element is given as $N_d$ and the dispersion of each element as measured by its Abbe number is given by $V_d$. The surface radii are positive when defined on a radius from the right of the optical axis and negative when defined on a radius from the left on the optical axos. Tables I and II define the lens of FIGS. 4 and 5, respectively, and Table III defines the lens of FIG. 6. The term BFL is the back focal length of the lens, FVD is the front vertex distance and M is magnification.

In the following lens designs, the movement of the compensator group is $$d < m F$$

where d is the movement of the compensator group between a first position corresponding to the longest equivalent focal length of the lens where the lens is focused at infinity, and a second position corresponding to an equivalent focal length of the lens where the lens is focused at the closest focusing position, where m is the magnification of the lens at its closest focusing position, and F is the longest equivalent focal length of the lens.

TABLE I

|    |    | SURFACE RADII (mm) | AXIAL DISTANCE BETWEEN SURFACES (mm) | $N_D$ | $V_D$ |
|----|----|--------------------|--------------------------------------|-------|-------|
|    | S1 | 89.600             |                                      |       |       |
| L1 |    |                    | 3.00                                 | 1.805 | 25.46 |
|    | S2 | 58.300             |                                      |       |       |
| L2 |    |                    | 9.000                                | 1.487 | 70.44 |
|    | S3 | −1215.000          |                                      |       |       |
|    |    |                    | 0.200                                |       |       |
|    | S4 | 92.200             |                                      |       |       |
| L3 |    |                    | 6.000                                | 1.487 | 70.44 |
|    | S5 | −1215.000          |                                      |       |       |

TABLE I-continued

|  |  | SURFACE RADII (mm) | AXIAL DISTANCE BETWEEN SURFACES (mm) | $N_D$ | $V_D$ |
|---|---|---|---|---|---|
|  |  |  | Z1 |  |  |
| L4 | S6 | 820.500 | 1.500 | 1.697 | 55.46 |
|  | S7 | 44.682 | 5.400 |  |  |
| L5 | S8 | −51.997 | 1.500 | 1.697 | 55.46 |
|  | S9 | 42.087 |  |  |  |
| L6 |  |  | 5.300 | 1.785 | 25.70 |
|  | S10 | 2199.200 | Z2 |  |  |
|  | S11 | 138.690 |  |  |  |
| L7 |  |  | 7.500 | 1.518 | 58.96 |
|  | S12 | −37.060 |  |  |  |
| L8 | S13 | −60.172 | 1.200 | 1.805 | 25.46 |
|  |  |  | Z3 |  |  |
|  | S14 | 35.135 |  |  |  |
| L9 | S15 | 233.400 | 6.400 | 1.518 | 58.96 |
|  |  |  | 0.100 |  |  |
|  | S16 | 41.157 |  |  |  |
| L10 | S17 | −250.000 | 6.000 | 1.487 | 70.39 |
| L11 | S18 | 58.684 | 1.500 | 1.806 | 40.74 |
|  |  |  | 4.810 |  |  |
|  |  | APERTURE | 10.403 |  |  |
|  | S19 | PLANO |  |  |  |
| PRISM |  |  | 13.200 | 1.517 | 64.20 |
|  | S20 | PLANO | 19.500 |  |  |
|  | S21 | −19.100 |  |  |  |
| L12 |  |  | 1.800 | 1.773 | 49.63 |
|  | S22 | −37.300 | 0.200 |  |  |
|  | S23 | 74.114 |  |  |  |
| L13 | S24 | −305.000 | 3.500 | 1.581 | 40.89 |

ZOOM SPACING DATA

| EFL | M | Z1 | Z2 | Z3 |
|---|---|---|---|---|
| 81.844 mm | 0.0 | 1.982 mm | 34.637 mm | 14.504 mm |
| 134.996 | 0.0 | 24.045 | 19.142 | 7.936 |
| 195.092 | 0.0 | 34.510 | 1.520 | 15.092 |
| 143.157 | −0.1 | 34.510 | 15.342 | 1.270 |

BFL = 40.0 mm
F/N = 3.5

TABLE II

|  |  | SURFACE RADII (mm) | AXIAL DISTANCE BETWEEN SURFACES (mm) | $N_D$ | $V_D$ |
|---|---|---|---|---|---|
| L1 | S1 | 91.632 | 3.000 | 1.785 | 26.06 |
|  | S2 | 54.537 |  |  |  |
| L2 |  |  | 7.340 | 1.517 | 64.20 |
|  | S3 | 4989.260 | 0.300 |  |  |
|  | S4 | 94.866 |  |  |  |
| L3 | S5 | −570.634 | 5.150 | 1.517 | 64.20 |
|  |  |  | Z1 |  |  |
|  | S6 | 599.211 |  |  |  |
| L4 | S7 | 69.969 | 1.500 | 1.806 | 40.65 |
|  |  |  | 3.100 |  |  |
|  | S8 | −66.080 |  |  |  |
| L5 | S9 | 26.680 | 1.500 | 1.697 | 55.47 |
| L6 |  |  | 4.510 | 1.785 | 25.71 |
|  | S10 | 83.175 | Z2 |  |  |
|  | S11 | 76.458 |  |  |  |
| L7 | S12 | −32.500 | 6.700 | 1.487 | 70.39 |
| L8 | S13 | −53.748 | 1.200 | 1.785 | 26.06 |
|  |  |  | Z3 |  |  |
|  | S14 | 29.548 |  |  |  |

TABLE II-continued

| | | | | | |
|---|---|---|---|---|---|
| L9 | | | 6.100 | 1.522 | 59.46 |
| | S15 | −80.198 | | | |
| L10 | | | 1.500 | 1.743 | 49.21 |
| | S16 | 233.381 | | | |
| | | | 4.810 | | |
| | | APERTURE | | | |
| | | | 2.000 | | |
| | S17 | PLANO | | | |
| PRISM | | | 22.000 | 1.517 | 64.20 |
| | S18 | PLANO | | | |
| | | | 18.994 | | |
| | S19 | −17.538 | | | |
| L11 | | | 1.600 | 1.743 | 49.21 |
| | S20 | −51.056 | | | |
| | | | 0.300 | | |
| | S21 | 143.799 | | | |
| L12 | | | 3.400 | 1.517 | 52.1 |
| | S22 | −58.905 | | | |

ZOOM SPACING DATA

| EFL | M | Z1 | Z2 | Z3 |
|---|---|---|---|---|
| 82.015 mm | 0.0 | 1.730 mm | 33.756 mm | 15.511 mm |
| 135.020 | 0.0 | 23.684 | 18.312 | 9.000 |
| 195.001 | 0.0 | 33.516 | 1.480 | 16.000 |
| 136.674 | −0.1 | 33.516 | 15.280 | 2.200 |

BFL = 39.0 mm
F/N = 4.5

TABLE III

| | | SURFACE RADII (mm) | AXIAL DISTANCE BETWEEN SURFACES (mm) | $N_D$ | $V_D$ |
|---|---|---|---|---|---|
| L1 | S1 | 72.323 | | | |
| | | | 3.000 | 1.784 | 26.06 |
| L2 | S2 | 51.619 | | | |
| | | | 9.000 | 1.517 | 64.20 |
| | S3 | −360.772 | | | |
| | | | Z1 | | |
| L3 | S4 | −137.086 | | | |
| | | | 1.500 | 1.720 | 50.34 |
| | S5 | 1440.597 | | | |
| | | | 3.500 | | |
| L4 | S6 | −77.924 | | | |
| | | | 1.500 | 1.699 | 53.9 |
| L5 | S7 | 37.610 | | | |
| | | | 4.510 | 1.785 | 25.70 |
| | S8 | 109.887 | | | |
| | | | Z2 | | |
| L6 | S9 | 517.353 | | | |
| | | | 4.000 | 1.483 | 70.2 |
| | S10 | −122.307 | | | |
| | | | 0.200 | | |
| L7 | S11 | 130.331 | | | |
| | | | 9.000 | 1.654 | 60.2 |
| | S12 | −42.523 | | | |
| L8 | S13 | −82.613 | | | |
| | | | 1.200 | 1.784 | 26.02 |
| | | | Z3 | | |
| L9 | S14 | 40.021 | | | |
| | | | 5.000 | 1.583 | 54.9 |
| L10 | S15 | −115.999 | | | |
| | | | 1.300 | 1.723 | 37.99 |
| | S16 | 265.106 | | | |
| | | | Z4 | | |
| L11 | S17 | 77.423 | | | |
| | | | 4.800 | 1.788 | 26.3 |
| | S18 | 209.204 | | | |
| | | | 1.300 | | |
| | S19 | −942.720 | | | |
| L12 | | | 3.000 | 1.834 | 37.34 |
| | S20 | 30.954 | | | |
| | | | 5.800 | | |
| | S21 | PLANO | | | |
| PRISM | | | 22.000 | 1.519 | 64.20 |
| | S22 | PLANO | | | |
| | | | 22.000 | | |
| | | | 4.147 | | |
| | S23 | −25.682 | | | |
| L13 | | | 1.600 | 1.640 | 60.15 |
| | S24 | −31.854 | | | |
| | S25 | −77.583 | | | |

TABLE III-continued

| | | | | | | |
|---|---|---|---|---|---|---|
| L14 | | | 3.800 | | 1.673 | 32.17 |
| | S26 | −44.208 | | | | |

ZOOM SPACING DATA

| EFL | Z1 | Z2 | Z3 | Z4 | M | FVD |
|---|---|---|---|---|---|---|
| 82.132 mm | 1.059 mm | 38.246 mm | 1.454 mm | 11.010 mm | 0.0 | 181.2 mm |
| 135.057 | 20.702 | 18.602 | 23.533 | 8.588 | 0.0 | 200.8 |
| 194.803 | 34.461 | 4.843 | 41.057 | 4.824 | 0.0 | 214.4 |
| 167.972 | 34.461 | 4.843 | 35.815 | 10.068 | −0.1 | 214.4 |

BFL = 39.0 mm
F/N = 4.0

Having thus described the invention, what is claimed is:

1. A zoom lens comprising from the object end, a first positive stationary group, a second variator group of negative power, manual means for axially moving said second group to vary the equivalent focal length of said lens, a third compensator group, and a fourth positive objective lens group, a prism for reflecting a portion of the light passing through said zoom lens, an automatic focus detector responsive to reflected light from said prism, a motor for moving said compensator group axially of said lens, said automatic focus detector being effective to operate said motor to move said compensator group axially of said lens to maintain the image created by said lens at the focal plane of the lens, said compensator group having a movement of a distance d between a first position corresponding to the longest equivalent focal length of the lens where the lens is focused at infinity, and a second position corresponding to an equivalent focal length of the lens where the lens is focused at the closest focusing position, in which $d < mF$ where m is the magnification of the lens at its closest focusing position and F is the longest equivalent focal length of the lens.

2. The lens of claim 1 where said compensator group is of positive power.

3. The zoom lens of claim 1 where said fourth group comprises two widely air spaced sub groups and said prism is positioned between said subgroups.

4. A lens according to claim 1 scaled to an image frame of 24×36 mm defined substantially as follows:

| LENS | SURFACE | SURFACE RADII (mm) | AXIAL DISTANCE BETWEEN SURFACES (mm) | $N_D$ | $V_D$ |
|---|---|---|---|---|---|
| L1 | S1 | 89.600 | | | |
| | | | 3.00 | 1.805 | 25.46 |
| L2 | S2 | 58.300 | | | |
| | | | 9.000 | 1.487 | 70.44 |
| | S3 | −1215.000 | | | |
| | | | 0.200 | | |
| L3 | S4 | 92.200 | | | |
| | | | 6.000 | 1.487 | 70.44 |
| | S5 | −1215.000 | | | |
| | | | Z1 | | |
| L4 | S6 | 820.500 | | | |
| | | | 1.500 | 1.697 | 55.46 |
| | S7 | 44.682 | | | |
| | | | 5.400 | | |
| L5 | S8 | −51.997 | | | |
| | | | 1.500 | 1.697 | 55.46 |
| | S9 | 42.087 | | | |
| L6 | | | 5.300 | 1.785 | 25.70 |
| | S10 | 2199.200 | | | |
| | | | Z2 | | |
| L7 | S11 | 138.690 | | | |
| | | | 7.500 | 1.518 | 58.96 |
| | S12 | −37.060 | | | |
| L8 | | | 1.200 | 1.805 | 25.46 |
| | S13 | −60.172 | | | |
| | | | Z3 | | |
| L9 | S14 | 35.135 | | | |
| | | | 6.400 | 1.518 | 58.96 |
| | S15 | 233.400 | | | |
| | | | 0.100 | | |
| L10 | S16 | 41.157 | | | |
| | | | 6.000 | 1.487 | 70.39 |
| | S17 | −250.000 | | | |
| L11 | | | 1.500 | 1.806 | 40.74 |
| | S18 | 58.684 | | | |
| | | | 4.810 | | |
| APERTURE | | | | | |
| | | | 10.403 | | |
| PRISM | S19 | PLANO | | | |
| | | | 13.200 | 1.517 | 64.20 |
| | S20 | PLANO | | | |
| | | | 19.500 | | |
| L12 | S21 | −19.100 | | | |
| | | | 1.800 | 1.773 | 49.63 |
| | S22 | −37.300 | | | |

-continued

| | | | | | |
|---|---|---|---|---|---|
| | S23 | 74.114 | 0.200 | | |
| L13 | | | 3.500 | 1.581 | 40.89 |
| | S24 | −305.000 | | | |

| ZOOM SPACING DATA | | | | |
|---|---|---|---|---|
| EFL | M | Z1 | Z2 | Z3 |
| 81.844 mm | 0.0 | 1.982 mm | 34.637 mm | 14.504 mm |
| 136.996 | 0.0 | 24.045 | 19.142 | 7.936 |
| 195.092 | 0.0 | 34.510 | 1.520 | 15.092 |
| 143.157 | −0.1 | 34.510 | 15.342 | 1.270 |

BFL = 40.0 mm
F/N = 3.5 where the lens comprises elements L1–L13 from the object end, the lens surfaces are designated S1–S24 from the object end, $N_d$ is the index of refraction of the lens elements, and $V_d$ is the dispersion of the lens elements as expressed by the Abbe number of the lens.

5. A lens according to claim 1 scaled to an image frame of 24×36 mm defined substantially as follows:

| | | SURFACE RADII (mm) | AXIAL DISTANCE BETWEEN SURFACES (mm) | $N_D$ | $V_D$ |
|---|---|---|---|---|---|
| L1 | S1 | 91.632 | 3.000 | 1.785 | 26.06 |
| L2 | S2 | 54.537 | 7.340 | 1.517 | 64.20 |
| | S3 | 4989.260 | 0.300 | | |
| L3 | S4 | 94.866 | 5.150 | 1.517 | 64.20 |
| | S5 | −570.634 | Z1 | | |
| L4 | S6 | 599.211 | 1.500 | 1.806 | 40.65 |
| | S7 | 69.969 | 3.100 | | |
| L5 | S8 | −66.080 | 1.500 | 1.697 | 55.47 |
| L6 | S9 | 26.680 | 4.510 | 1.785 | 25.71 |
| | S10 | 83.175 | Z2 | | |
| L7 | S11 | 76.458 | 6.700 | 1.487 | 70.39 |
| L8 | S12 | −32.500 | 1.200 | 1.785 | 26.06 |
| | S13 | −53.748 | Z3 | | |
| L9 | S14 | 29.548 | 6.100 | 1.522 | 59.46 |
| L10 | S15 | −80.198 | 1.500 | 1.743 | 49.21 |
| | S16 | 233.381 | 4.810 | | |
| | APERTURE | | 2.000 | | |
| PRISM | S17 | PLANO | 22.000 | 1.517 | 64.20 |
| | S18 | PLANO | 18.994 | | |
| L11 | S19 | −17.538 | 1.600 | 1.743 | 49.21 |
| | S20 | −51.056 | 0.300 | | |
| L12 | S21 | 143.799 | 3.400 | 1.517 | 52.1 |
| | S22 | −58.905 | | | |

| ZOOM SPACING DATA | | | | |
|---|---|---|---|---|
| EFL | M | Z1 | Z2 | Z3 |
| 82.015 mm | 0.0 | 1.730 mm | 33.756 mm | 15.511 mm |
| 135.020 | 0.0 | 23.684 | 18.312 | 9.000 |
| 195.001 | 0.0 | 33.516 | 1.480 | 16.000 |
| 136.674 | −0.1 | 33.516 | 15.280 | 2.200 |

BFL = 39.0 mm
F/N = 4.5 where the lens comprises elements L1–L12 from the object end, the lens surfaces are designated S1–S22 from the object end, $N_d$ is the index of refraction of the lens elements, and $V_d$ is the dispersion of the lens elements as expressed by the Abbe number of the lens.

6. A zoom lens comprising from the object end a first positive group, a second negative group, a third positive group, a fourth compensator group, and a fifth rear group, said first and third groups being movable in fixed relation to vary the equivalent focal length of said lens while said second group remains stationary, manual means for axially moving said first and third groups, a prism in said fifth group for reflecting a portion of the light passing through said zoom lens, a motor operatively connected to said compensator group for moving said compensator group axially of said lens, an automatic focus detector responsive to light reflected by said prism, said automatic focus detector being effective to operate said motor to move said compensator group axially of said lens to maintain an image created by said lens at the focal plane of said lens, said compensator group having a movement of a distance d between a first position corresponding to the longest equivalent focal length of the lens where the lens is focused at infinity, and a second position corresponding to an equivalent focal length of the lens where the lens is focused at the closest focusing position, in which $d < mF$ where m is the magnification of the lens at its closest focusing position and F is the longest equivalent focal length of the lens.

7. The lens of claim 6 where said compensator group is of positive power.

8. The zoom lens of claim 6 where said fifth group comprises two widely air spaced rub groups and said prism is positioned between said subgroups.

9. A lens according to claim 6 scaled to an image frame of 24×36 mm defined substantially as follows:

| | | SURFACE RADII (mm) | AXIAL DISTANCE BETWEEN SURFACES (mm) | $N_D$ | $V_D$ |
|---|---|---|---|---|---|
| L1 | S1 | 72.323 | 3.000 | 1.784 | 26.06 |
| L2 | S2 | 51.619 | 9.000 | 1.517 | 64.20 |
| | S3 | −360.772 | Z1 | | |
| L3 | S4 | −137.086 | 1.500 | 1.720 | 50.34 |
| | S5 | 1440.597 | 3.500 | | |
| L4 | S6 | −77.924 | 1.500 | 1.699 | 53.9 |
| L5 | S7 | 37.610 | 4.510 | 1.785 | 25.70 |
| | S8 | 109.887 | Z2 | | |
| L6 | S9 | 517.353 | 4.000 | 1.483 | 70.2 |
| | S10 | −122.307 | 0.200 | | |
| L7 | S11 | 130.331 | 9.000 | 1.654 | 60.2 |
| L8 | S12 | −42.523 | 1.200 | 1.784 | 26.02 |
| | S13 | −82.613 | Z3 | | |
| L9 | S14 | 40.021 | 5.000 | 1.583 | 54.9 |
| L10 | S15 | −115.999 | 1.300 | 1.723 | 37.99 |
| | S16 | 265.106 | Z4 | | |
| L11 | S17 | 77.423 | 4.800 | 1.788 | 26.3 |
| | S18 | 209.204 | 1.300 | | |
| L12 | S19 | −942.720 | 3.000 | 1.834 | 37.34 |
| | S20 | 30.954 | 5.800 | | |
| PRISM | S21 | PLANO | 22.000 | 1.519 | 64.20 |
| | S22 | PLANO | 4.147 | | |
| S23 L13 S24 | | −25.682 −31.854 | 1.600 0.200 | 1.640 | 60.15 |
| S25 L14 S26 | | −77.583 −44.208 | 3.800 | 1.673 | 32.17 |

| | | ZOOM SPACING DATA | | | | |
|---|---|---|---|---|---|---|
| EFL | Z1 | Z2 | Z3 | Z4 | M | FVD |
| 82.132 mm | 1.059 mm | 38.246 mm | 1.454 mm | 11.010 mm | 0.0 | 181.2 mm |
| 135.057 | 20.702 | 18.602 | 23.533 | 8.588 | 0.0 | 200.8 |
| 194.803 | 34.461 | 4.843 | 41.057 | 4.824 | 0.0 | 214.4 |

-continued

| 167.972 | 34.461 | 4.843 | 35.815 | 10.068 | −0.1 | 214.4 |

BFL [−] = 39.0 mm
F/N = 4.0 where the lens comprises elements L1–L15 from the object end, the lens surfaces are designated S1–S27 from the object end, $N_d$ is the index of refraction of the lens elements, and $V_d$ is the dispersion of the lens elements as expressed by the Abbe number of the lens.

10. A zoom lens of the type where one or more variator lens groups move to vary the equivalent focal length of said lens and a compensator lens group moves to compensate for change in the position of the focal plane of the lens with change in equivalent focal length, each of said variator and compensator lens groups having a mount therefor, a plurality of guide rods mounted longitudinally in said lens, said variator and compensator lens groups mounts slidably mounted to said rods, said mount for said compensator lens group having a threaded connection to one of said rods whereby upon rotation of said one of said rods said compensator lens group moves axially of said lens, said zoom lens including a prism and an automatic focus detecting system, said prism reflecting a portion of the light passing through said zoom lens, said automatic focus detector being responsive to light from said prism, a motor operative to rotate said one rod, said automatic focus detector being effective to operate said motor too move said compensator lens group on said rods axially of said lens to maintain an image created by said lens in focus at the focal plane of said lens as said one or more variator lens groups are moved to vary the equivalent focal length of said lens, and means for moving said one or more variator lens groups, said compensator lens group having a movement of a distance d between a first position corresponding to the longest equivalent focal length of the lens where the lens is focused at infinity, and a second position corresponding to an equivalent focal length of the lens where the lens is focused at the closest focusing position, in which d<mF where m is the magnification of the lens at its closest focusing position and F is the longest equivalent focal length of the lens.

* * * * *